(12) United States Patent
Ding et al.

(10) Patent No.: US 12,440,924 B2
(45) Date of Patent: Oct. 14, 2025

(54) LASER-BASED HIGH-THROUGHPUT SURFACE NANO-STRUCTURING (NHSN) PROCESS

(71) Applicant: University of Iowa Research Foundation, Iowa City, IA (US)

(72) Inventors: Hongtao Ding, Coralville, IA (US); Qinghua Wang, Iowa City, IA (US); Avik Samanta, Iowa City, IA (US); Ninggang Shen, Iowa City, IA (US)

(73) Assignee: University of Iowa Research Foundation, Iowa City, IA (US)

(*) Notice: Subject to any disclaimer, the term of this patent is extended or adjusted under 35 U.S.C. 154(b) by 796 days.

(21) Appl. No.: 17/175,223

(22) Filed: Feb. 12, 2021

(65) Prior Publication Data

US 2021/0237201 A1 Aug. 5, 2021

Related U.S. Application Data

(62) Division of application No. 16/107,496, filed on Aug. 21, 2018, now abandoned.

(60) Provisional application No. 62/547,999, filed on Aug. 21, 2017.

(51) Int. Cl.
*B23K 26/352* (2014.01)
*B05D 5/08* (2006.01)
*B05D 1/18* (2006.01)
*B05D 3/06* (2006.01)
*B05D 3/12* (2006.01)
*B05D 7/14* (2006.01)

(52) U.S. Cl.
CPC .............. *B23K 26/355* (2018.08); *B05D 5/08* (2013.01); *B05D 1/18* (2013.01); *B05D 3/06* (2013.01); *B05D 3/12* (2013.01); *B05D 7/14* (2013.01)

(58) Field of Classification Search
CPC ... B05D 1/18; B05D 3/06; B05D 3/12; B05D 5/08; B05D 7/14; B23K 26/122; B23K 26/355
See application file for complete search history.

(56) References Cited

U.S. PATENT DOCUMENTS

2011/0147219 A1 6/2011 Lambourne et al.
2013/0337226 A1* 12/2013 Curran ..................... C09D 5/00
427/322
2014/0314995 A1* 10/2014 Liu ...................... B23K 26/009
219/121.72

(Continued)

OTHER PUBLICATIONS

TAI SpecialSteel (Year: 2016).*

(Continued)

*Primary Examiner* — Jenny R Wu
(74) *Attorney, Agent, or Firm* — Schwegman Lundberg & Woessner, P.A.

(57) ABSTRACT

Embodiments of the present invention are directed to a surface modified metal piece comprising a first major surface, wherein at least one portion of the first major surface: comprises the reaction product of a surface modifier; has a random micro- and nanoscale structure; and has at least one of a water contact angle when exposed to water of at least about 120° and a spectral reflectance of less than about 25% within the visible spectrum. Other embodiments relate to processes and methods for making such a surface modified metal piece.

13 Claims, 4 Drawing Sheets

(56) References Cited

U.S. PATENT DOCUMENTS

2015/0136226 A1   5/2015   Guo et al.
2019/0054571 A1   2/2019   Ding et al.

OTHER PUBLICATIONS

Laser ablation of silicon in water nanosecond and femtosecond pulses (Year: 2005).*
"U.S. Appl. No. 16/107,496, Final Office Action mailed Sep. 29, 2020", 11 pgs.
"U.S. Appl. No. 16/107,496, Non Final Office Action mailed Mar. 10, 2020", 11 pgs.
"U.S. Appl. No. 16/107,496, Response filed Feb. 3, 2020 to Restriction Requirement mailed Dec. 27, 2019", 6 pgs.
"U.S. Appl. No. 16/107,496, Response filed Sep. 10, 2020 to Non Final Office Action mailed Mar. 10, 2020", 8 pgs.
"U.S. Appl. No. 16/107,496, Restriction Requirement mailed Dec. 27, 2019", 7 pgs.
"TAI Special Steel", AISI 4130 Steel, [Online] Retrieved from the internet: <www.astmsteel.com> accessed Mar. 5, 2020, (2016).

* cited by examiner

LASER-BASED HIGH-THROUGHPUT SURFACE NANO-STRUCTURING (NHSN) PROCESS

CROSS-REFERENCE TO RELATED APPLICATIONS

This application is a division of U.S. patent application Ser. No. 16/107,496, filed Aug. 21, 2018, which application claims the benefit of priority to U.S. Provisional Appl. Ser. No. 62/547,999, filed Aug. 21, 2017, which are incorporated by reference as if set forth herein in their entirety.

BACKGROUND OF THE INVENTION

Existing laser-based surface texturing methods often use ultrashort pulse lasers (e.g., femtosecond or picosecond pulse lasers), to generate periodic micro-/nano-scale features necessary for the super-hydrophobic or anti-reflective surfaces. Such fabrication methods scan the material surface at a very fine spatial resolution to create hierarchical micro- and nano-scale structures leading to an extremely low throughput. After ultrashort laser texturing, a chemical surface treatment process often ensues to reduce the surface energy and produces super-hydrophobicity. New methods are therefore needed for creating surfaces having, among other features, super-hydrophobicity given the low throughput of existing methods.

SUMMARY OF THE INVENTION

Embodiments described herein relate generally to a nanosecond laser-based high-throughput surface nanostructuring (nHSN) process to scale up the nano-structuring speed for a large surface area for engineering metal alloys. The nHSN process comprises two steps: (1) a high energy nanosecond pulse laser scans the material surface contained under water using a large spatial increment and a fast processing speed; and (2) the laser textured surface is further chemically treated. Random nanoscale surface structures are achieved from the nHSN process. Surface tests of wettability and reflectance demonstrated that the processed surfaces are, among other things, super-hydrophobic and highly antireflective within the visible and infrared spectra for various engineering metal alloys including steels, aluminum alloys, titanium alloys, and magnesium alloys. Test results showed that the nHSN process produces super-hydrophobic or highly anti-reflective surfaces over a wide range of laser parameters. It was further demonstrated that the processed surfaces are mechanically enhanced with microhardness increased by about 20%. Compared with the existing ultrashort laser-based surface texturing techniques, the nHSN process significantly increases the processing rate from hundreds of minutes per square inch to seconds per square inch, and also enables large area processing for practical throughput.

DESCRIPTION OF THE DRAWINGS

The drawings illustrate generally, by way of example, but not by way of limitation, various embodiments discussed in the present document.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Embodiments described herein relate to a surface modified metal piece comprising: a first major surface, wherein at least one portion of the first major surface: comprises the reaction product of a surface modifier; has a random micro- and nanoscale structure; and has at least one of a water contact angle when exposed to water of at least about 120° and a spectral reflectance of less than about 25% within the visible spectrum. In some embodiments, at least one portion of the first major surface comprising the reaction product of the surface modifier has a water contact angle when exposed to water of at least about 120° and a spectral reflectance of less than about 30% within the visible spectrum.

In some embodiments, at least one portion of the first major surface comprising the reaction product of the surface modifier has a water contact angle when exposed to water of at least about 125°; at least about 130°; at least about 135°; at least about 140°; at least about 145°; or at least about 150°. In some embodiments, at least one portion of the first major surface comprising the reaction product of the surface modifier has a water contact angle when exposed to water of about 120° to about 170°; about 130° to about 170°; about 140° to about 160°; about 150° to about 170°; about 150° to about 160°; or about 150° to about 165°.

Figure 1:
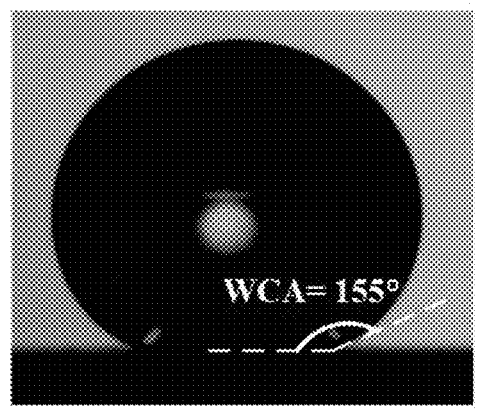
FIG. 1 is an optical shadowgraph obtained using the CMOS camera.

The water contact angle (WCA) for the at least one portion of the first major surface can be measured in any suitable way. One method for measuring the water contact angle for the at least one portion of the first major surface involves using a contact angle goniometer (e.g., a Rame-Hart model 100 goniometer) coupled with a high-resolution CMOS camera (e.g., 6~60× magnification, Thor Laboratories). For each WCA measurement, about 4 µl volume of water is dropped to form a still water droplet on the specimen surface, and its optical shadowgraph is obtained using the CMOS camera, as shown in FIG. 1. The optical shadowgraph is quantitatively analyzed using ImageJ software to determine the WCA for each measurement. Multiple WCA measurements are performed at various locations inside each specimen surface, and an average value of measurement results is obtained.

In other embodiments, at least one portion of the first major surface comprising the reaction product of the surface modifier has a spectral reflectance of less than about 35%; less than about 30%; less than about 25%; less than about 20%; less than about 15%; less than about 10%; or less than about 5% within the visible spectrum (e.g., 400 nm to about 700 nm). In some embodiments, at least one portion of the first major surface comprising the reaction product of the surface modifier has a spectral reflectance of about 1% to about 35%; about 1% to about 25%; about 10% to about 25%; about 5% to about 30%; about 5% to about 20%; about 5% to about 15%; or about 1% to about 5% within the visible spectrum.

Figure 2:
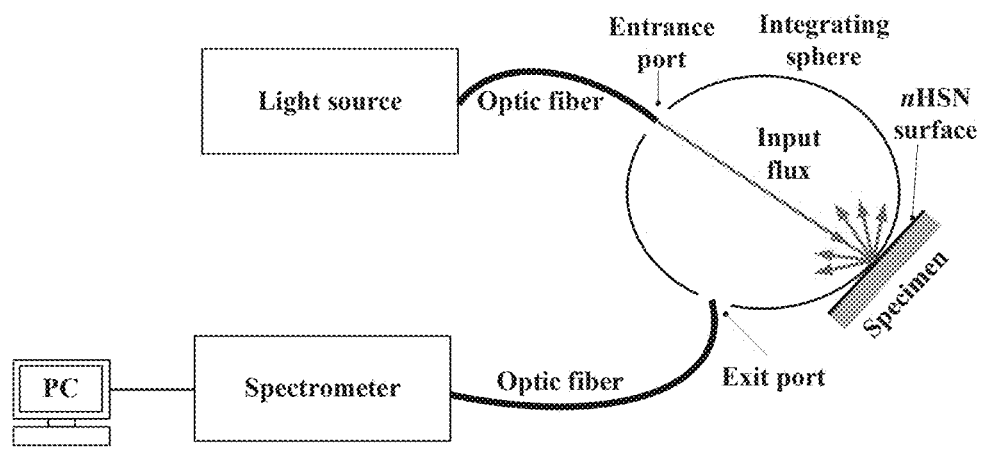
FIG. 2 is a schematic representation of the instruments used to determine the spectral reflectance for the at least one portion of the first major surface.

The spectral reflectance within the visible spectrum for the at least one portion of the first major surface can be measured in any suitable way. One method for measuring the spectral reflectance for the at least one portion of the first major surface involves using a UV-VIS-NIR spectrometer (e.g., USB4000 & Flame NIR, Ocean Optics Co.) with normal incidence, as schematically illustrated in FIG. 2. Reflectance of the surface is its effectiveness in reflecting radiant energy and defined as the fraction of incident electromagnetic power that is reflected by the surface. The most general definition for reflectance ρ is the ratio of the radiant flux reflected $\phi_r$ to the incident radiant flux $\phi_i$, or $$\rho = \frac{\Phi_r}{\Phi_i} \quad (1)$$

Spectral reflectance is similarly defined at a specified wavelength λ as $$\rho(\lambda) = \frac{\Phi_{\lambda r}}{\Phi_{\lambda i}} \quad (2)$$

The UV-VIS-NIR spectrometer measures the reflectance of the specimen surface in the wavelength range of about 450 nm to about 1670 nm. An integrating sphere is connected to the spectrometer for reflectance data collection. Before reflectance measurement, calibration of the reflectance scale is performed by measuring the incident flux remaining in the sphere after reflecting from a standard reference material. Then the specimen is placed against the entrance port for the actual reflectance measurement. OCEANVIEW® software was utilized to process and visualize the spectral reflectance measurement results. Each specimen surface is measured for multiple (e.g., four) times at various locations, and the averaged spectral reflectance is assessed.

In some embodiments, in addition to the WCA and reflectance described herein, the at least one portion of the first major surface has a spectral reflectance of less than about 60%; less than about 55%; less than about 50%; less than about 45%; less than about 40%; less than about 30%; less than about 35%; less than about 30%; less than about 25%; less than about 20%; less than about 15%; less than about 10%; or less than about 5% within the IR-A spectrum (e.g., 700 nm to 1400 nm). In other embodiments, in addition to the WCA and reflectance described herein, the at least one portion of the first major surface has a spectral reflectance of about 1% to about 60%; about 5% to about 35%; about 1% to about 5%; about 20% to about 50%; about 20% to about 35%; about 15% to about 35%; about 40% to about 60%; or about 25% to about 35% within the IR-A spectrum.

In some embodiments, in addition to the WCA and reflectance described herein, the at least one portion of the first major surface has a spectral reflectance of less than about 60%; less than about 55%; less than about 50%; less than about 45%; less than about 40%; less than about 30%; less than about 35%; less than about 30%; less than about 25%; less than about 20%; less than about 15%; less than about 10%; or less than about 5% within the IR-B spectrum (e.g., 1400 nm to 3000 nm). In other embodiments, the at least one portion of the first major surface has a spectral reflectance of about 1% to about 60%; about 5% to about 35%; about 1% to about 5%; about 20% to about 50%; about 20% to about 35%; about 15% to about 35%; about 40% to about 60%; or about 25% to about 35% within the IR-B spectrum.

In some embodiments, in addition to the WCA and reflectance described herein and the spectral reflectance within the IR-A spectrum, the at least one portion of the first major surface has a spectral reflectance of less than about 60%; less than about 55%; less than about 50%; less than about 45%; less than about 40%; less than about 30%; less than about 35%; less than about 30%; less than about 25%; less than about 20%; less than about 15%; less than about 10%; or less than about 5% within the IR-B spectrum. In other embodiments, in addition to the WCA and reflectance described herein and the spectral reflectance within the IR-A spectrum, the at least one portion of the first major surface has a spectral reflectance of about 1% to about 60%; about 5% to about 35%; about 1% to about 5%; about 20% to about 50%; about 20% to about 35%; about 15% to about 35%; about 40% to about 60%; or about 25% to about 35% within the IR-B spectrum.

In some embodiments, the modified metal piece is made of any suitable metal including steel, titanium, aluminum, magnesium, and alloys thereof. Specific examples of suitable materials for the modified metal piece include, but are not limited to, AISI 4130 steel, titanium Ti-6Al-4V alloy (Ti-6Al-4V), aluminum alloy 6061 alloy (AA-6061) or magnesium AZ31B alloy (Mg AZ31B).

The modified metal piece of the various embodiments described herein can be made of aluminum alloys. Aluminum alloys can be categorized into a number of groups based on the particular material's characteristics such as its ability to respond to thermal and mechanical treatment and the primary alloying element added to the aluminum alloy. Wrought and cast aluminums have different systems of identification. The wrought system is a 4-digit system and the castings having a 3-digit and 1-decimal place system. In some embodiments, wrought aluminum alloys are contemplated, including the 1000-, 2000-, 3000-, 4000-, 5000-, 6000-, and 7000-series of wrought aluminum alloys which can be categorized as shown in Table 1, where: x, if different from 0, indicates a modification of the specific alloy, and y and z are arbitrary numbers given to identify a specific alloy in the series. For example, 5000-series alloy 5183, the number 5 indicates that it is of the magnesium alloy series, the 1 indicates that it is the 1st modification to the original alloy 5083, and the 83 identifies it in the 5xyz series. The only exception to this alloy numbering system is with the 1xyz series aluminum alloys (pure aluminums) in which case, y and z provide the minimum aluminum percentage above 99%. Thus, for example, 1000-series alloy 1350 comprises 99.50% minimum aluminum.

TABLE 1

| Alloy Series | Principal Alloying Element |
| --- | --- |
| 1xyz | 99.000% aluminum |
| 2xyz | Copper |
| 3xyz | Manganese |
| 4xyz | Silicon |
| 5xyz | Magnesium |
| 6xyz | Magnesium and silicon |
| 7xyz | Zinc |

As discussed herein, at least one portion of the first major surface comprises the reaction product of a surface modifier. In some embodiments, the surface modifier is a silane of the formula (I):

$$X^1_3SiR^1 \quad (1)$$

wherein each $X^1$ is halogen or a $C_1$-$C_5$-alkoxy group; and $R^1$ is a $C_8$-$C_{20}$-fluoro-substituted alkyl group.

The terms "halo," "halogen," or "halide" group, as used herein, by themselves or as part of another substituent, mean, unless otherwise stated, a fluorine, chlorine, bromine, or iodine atom. In some embodiments $X^1$ is chlorine. The term "alkoxy" as used herein refers to an "—O-alkyl" or "—O— cycloalkyl" group. The term "alkyl," as used herein refers to substituted or unsubstituted straight chain and branched alkyl groups and cycloalkyl groups having from 1 to 40 carbon atoms ($C_1$-$C_{40}$), 1 to about 20 carbon atoms ($C_1$-$C_{20}$), 1 to 12 carbons ($C_1$-$C_{12}$), 1 to 8 carbon atoms ($C_1$-$C_8$), or, in some embodiments, from 1 to 6 carbon atoms ($C_1$-$C_6$). Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neo-pentyl, isopentyl, and 2,2-dimethylpropyl groups. Representative substituted alkyl groups can be substituted one or more times with any of the organofunctional groups listed herein, for example, amino, hydroxy, cyano, carboxy, nitro, thio, alkoxy, and halogen groups.

The term "cycloalkyl" as used herein refers to substituted or unsubstituted cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. In some embodiments, cycloalkyl groups can have 3 to 6 carbon atoms ($C_3$-$C_8$). Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Representative substituted cycloalkyl groups can be substituted one or more times with any of the organofunctional groups listed herein, for example, amino, hydroxy, cyano, carboxy, nitro, thio, alkoxy, and halogen groups.

In some embodiments, $R^1$ is a group having the formula $C_n$—$F_{2n+1}$-$(CH_2)_2$-(organofunctional group), wherein the "organofunctional group" is 1H, 1H, 2H, 2H-perfluoralkyl; and n is an integer from 8 to 20.

As discussed herein, the at least one portion of the first major surface comprises the reaction product of a surface modifier. The reaction product results from a reaction between the at least one portion of the first major surface that has been exposed to nanosecond laser-based high-throughput surface nanostructuring (nHSN) and the surface modifier. While not wishing to be bound by any specific theory, it is believed that the reaction between the surface modifier (e.g., a silane of the formula (I)) and the at least one portion of the first major surface that has been exposed to nHSN can be described by two mechanisms: (1) etching, or (2) surface fluorination. Scanning electron micrographs of at least one portion of the first major surface that has been exposed to nHSN shows the formation of nanostructures that could be the result of etching of the at least one portion of the first major surface that has been exposed to nHSN. But there are also chemical analyses that have been performed, whose results are probative of surface fluorination. And one cannot rule out that it could be a combination of etching and surface fluorination. Regardless of which mechanism(s) is (are) operative, the surface modifier somehow reacts with the at least one portion of the first major surface that has been exposed to nHSN to give a reaction product that appears to be covalently bound to the at least one portion of the first major surface.

Figure 3:
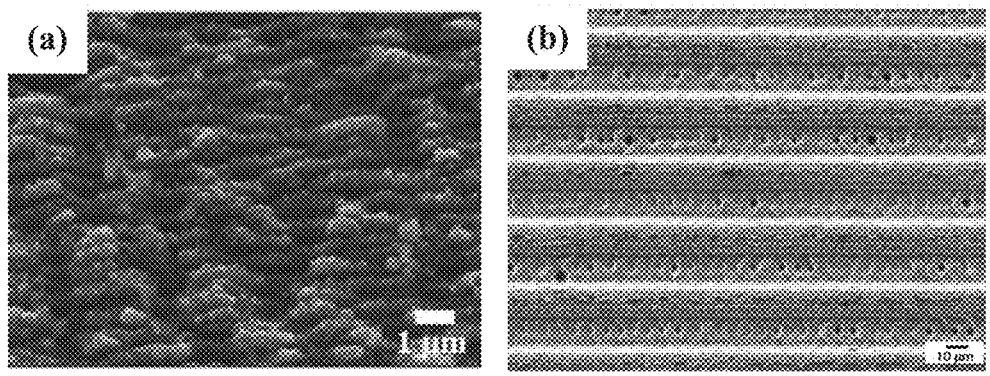
FIG. 3 is scanning electron microscope (SEM) micrographs of the surface structures prepared using existing laser-based surface texturing techniques. (a) Laser-induced periodic surface structures (LIPSS) (Cunha et al. 2013); (b) hierarchical structure consisting of trench micropattem (Martínez-Calderon et al. 2016).

As described herein, the at least one portion of the first major surface has a random micro- and nanoscale structure. In contrast, existing laser-based surface texturing methods often use ultrashort pulse lasers (e.g., femtosecond or picosecond pulse lasers) generate ordered or periodic micro-/nano-scale features. For example, existing laser-based texturing methods create patterns of microscale trenches, while others create laser-induced periodic surface structure (LIPSS), which is periodic at the nanoscale. See, e.g., SEM micrographs shown in FIG. 3. But none of the existing laser-based texturing methods create random micro- and nanoscale structure, such as that shown in FIG. 4.

Figure 4:
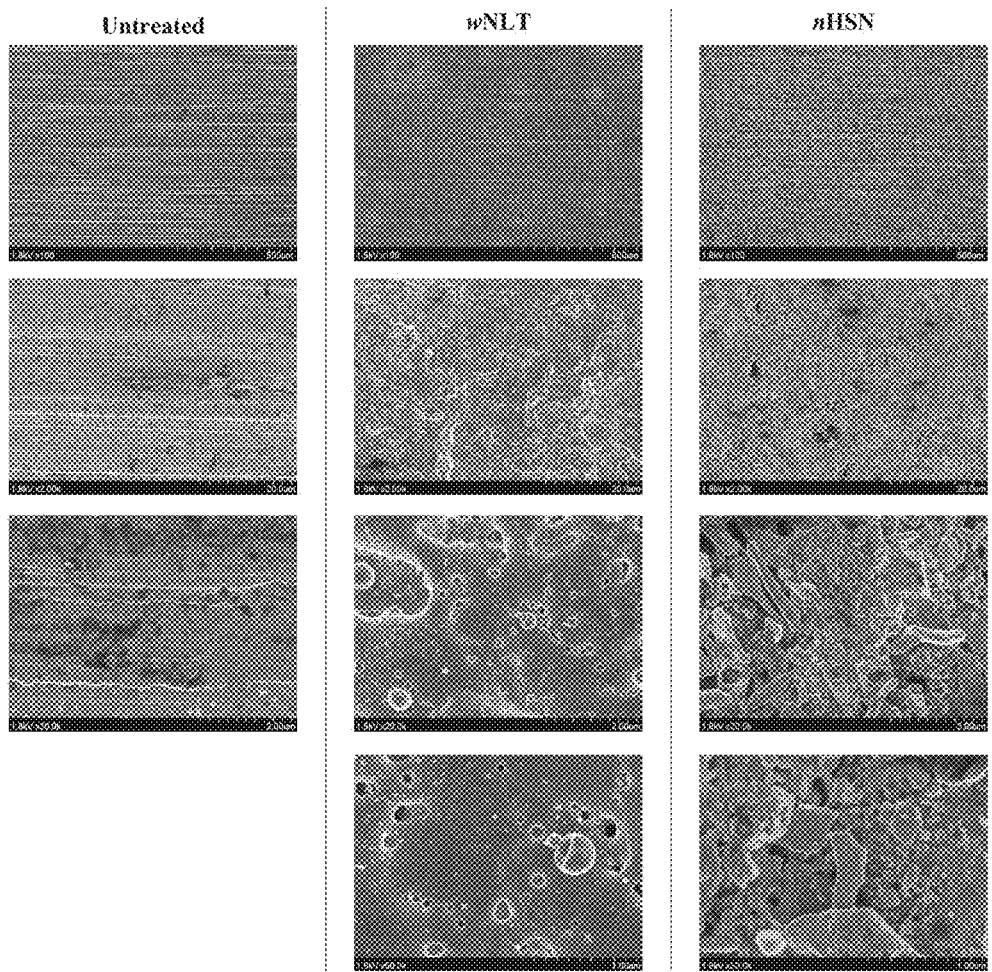
FIG. 4 is scanning electron microscope (SEM) micrographs of various AISI 4130 steel specimens.

FIG. 4 is scanning electron microscope (SEM) micrographs of various AISI 4130 steel specimens. The specimens processed by nHSN and water-confined nanosecond laser texturing (wNLT) used the same laser power intensity of 7.3 GW/cm². Micrographs of untreated raw specimen show a horizontal lay pattern at various magnifications from 100× to 20,000×. The wNLT, which has not been treated with a surface modifying agent, shows the microscale ripples induced from the nanosecond laser-steel interaction under water confinement. The nHSN specimen shows an isotropic texture with numerous tiny pores homogenously distributed at 100×~2,000× magnifications. But viewed under 20,000× ~50,000× magnifications, the nHSN specimen is characterized by numerous structures of various random shapes of rods, cones and cavities. These features vary in size ranging from less than 100 nm to several hundreds of nm.

The surface modified metal piece(s) described herein can be made by a process comprising: immersing a metal piece having a first major surface in an aqueous medium; texturing at least a portion of the first major surface along a nanosecond laser scan path at a laser scanning time of at least about 0.25 seconds/in² to obtain a textured metal piece having a textured surface along the scan path; removing the textured metal piece from the aqueous medium; and immersing the textured metal piece in a solution comprising a surface modifier, wherein the surface modifier reacts with the textured surface to obtain a modified metal surface; wherein: at least one of the textured surface along the scan path and the textured surface that reacts with the surface modifier has a random micro- and nanoscale structure; the nanosecond laser emits pulses of an appropriate energy onto the first major surface along the scan path; the nanosecond laser has a laser power intensity of greater than about 0.2 GW/cm²; the surface modifier reacts substantially only with the textured surface along the scan path; and the textured surface along the scan path that reacts with the surface modifier has at least one of a water contact angle when exposed to water of at least 120° and a spectral reflectance of less than 25% within the visible spectrum.

As described herein, the laser scanning time can be at least about 0.25 seconds/in$^2$, but can be significantly faster at, e.g., at least about 0.1 seconds/in$^2$; at least about 0.05 seconds/in$^2$; at least about 0.025 seconds/in$^2$; from about 0.025 seconds/in$^2$ to about 15 seconds/in$^2$; about 0.025 seconds/in$^2$ to about 0.25 seconds/in$^2$; about 0.1 seconds/in$^2$ to about 0.9 seconds/in$^2$; or about 1 seconds/in$^2$ to about 5 seconds/in$^2$.

As used herein, the term "appropriate energy" generally refers to a nanosecond laser pulse of from about 300 mJ to about 20 J; about 300 mJ to about 800 mJ; about 300 mJ to about 2 J; about 300 mJ to about 1 J; about 500 mJ to about 1 J; about 500 mJ to about 1.5 J; about 500 mJ to about 800 mJ; or about 450 mJ to about 900 mJ.

As described herein, the laser intensity can be greater than about 0.2 GW/cm$^2$ and can be greater than about 0.5 GW/cm$^2$; greater than about 1 GW/cm$^2$; greater than about 1.5 GW/cm$^2$; greater than about 2 GW/cm$^2$; greater than about 5 GW/cm$^2$; greater than about 10 GW/cm$^2$; greater than about 15 GW/cm$^2$; greater than about 20 GW/cm$^2$; about 0.2 GW/cm$^2$ to about 20 GW/cm$^2$; about 0.2 GW/cm$^2$ to about 5 GW/cm$^2$; about 5 GW/cm$^2$ to about 15 GW/cm$^2$; or about 10 GW/cm$^2$ to about 20 GW/cm$^2$.

Embodiments described herein also relate to a method of making a surface modified metal piece, the method comprising: immersing a metal piece having a first major surface in an aqueous medium; texturing at least a portion of the first major surface along a nanosecond laser scan path at a laser scanning time of at least about 0.25 seconds/in$^2$ to obtain a textured metal piece having a textured surface along the scan path; removing the textured metal piece from the aqueous medium; and immersing the textured metal piece in a solution comprising a surface modifier, wherein the surface modifier reacts with the textured surface to obtain a modified metal surface; wherein: at least one of the textured surface along the scan path and the textured surface that reacts with the surface modifier has a random micro- and nanoscale structure; the nanosecond laser emits pulses of an appropriate energy onto the first major surface along the scan path; the nanosecond laser has a laser power intensity of greater than about 0.2 GW/cm$^2$; the surface modifier reacts substantially only with the textured surface along the scan path; and the textured surface along the scan path that reacts with the surface modifier has at least one of a water contact angle when exposed to water of at least 120° and a spectral reflectance of less than 25% within the visible spectrum.

As used herein, the term "aqueous medium" generally refers to a medium comprising water but can include a medium comprising 50% or more water and a water miscible solvent such as an alkanol (e.g., methanol or ethanol), acetonitrile, acetone, ethyl acetate, and the like and mixtures thereof. In some embodiments, the aqueous medium is comprised of 100% water.

The solution comprising the surface modifier can comprise the surface modifier in a suitable solvent. Suitable solvents include, but are not limited to, alkanols (e.g., methanol or ethanol), acetone, and ethylene glycol.

The surface modified metal pieces of the various embodiments described herein have various applications where the surface, so modified, resist icing, reduce drag, are self-cleaning, are anti-biofouling, resist corrosion, and have low spectral reflectance of visible, IR-A, and/or IR-B radiation.

Anti-icing on the metal structural surface has long been a technological challenge for aviation, space flight, and for radar devices. The methods of making a surface modified metal piece according to the disclosure can provide, among other things, a superhydrophobic metal surface to address such a challenge. Water droplets can roll off the cold superhydrophobic surface quickly without freezing. In contrast, drops on an untreated surface spread quickly and form a thin film on the surface that can freeze immediately.

The methods of making a surface modified metal piece according to the disclosure can provide metal surfaces on marine vehicles that are, among other things, superhydrophobic so as to reduce the frictional drag and save in energy consumption. This drag-reduction property provides a significant potential for energy-savings in applications ranging from propulsion of marine vessels to transporting liquids through conduits.

The methods of making a surface modified metal piece according to the disclosure can provide metal surfaces that are, among other things, superhydrophobic so as to facilitate the de-wetting of the surface and enable water droplets to roll off easily, taking away the dirt and other pollutants.

The methods of making a surface modified metal piece according to the disclosure can provide metal surfaces that are, among other things, superhydrophobic so as to enhance anti-biofouling capability.

The methods of making a surface modified metal piece according to the disclosure can provide metal surfaces that are, among other things, superhydrophobic so as to repel water and prevent the metal surface from becoming corroded.

The methods of making a surface modified metal piece according to the disclosure can provide metal surfaces that are, among other things, highly absorptive so as to have low spectral reflectance of visible, IR-A, and/or IR-B radiation. Such surfaces would be particularly useful in optical packaging, thermal detection, and telescopes.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

EXAMPLES

The present invention can be better understood by reference to the following examples which are offered by way of illustration. The present invention is not limited to the examples given herein.

Example 1

Figure 5:
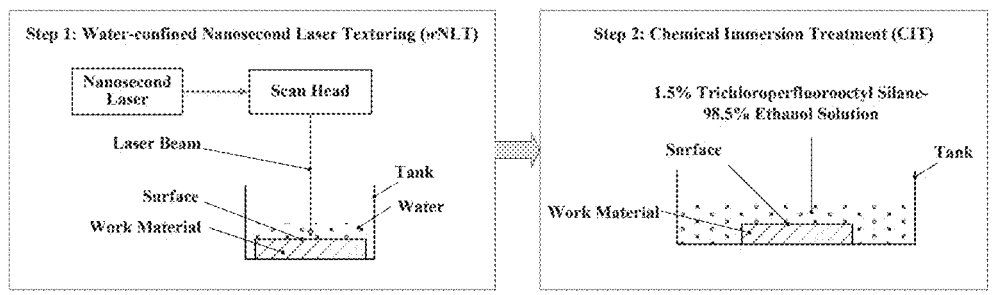
FIG. 5 is a schematic representation of the process flow of nanosecond laser-based high-throughput surface nano-structuring (nHSN).

The nanosecond laser-based high-throughput surface nanostructuring (nHSN) process comprises two steps: (1) a high energy nanosecond pulse laser scans the material surface contained under water using a large spatial increment and a fast processing speed; and (2) the laser textured surface is further chemically treated. See FIG. 5.

The first step of the process is referred to herein as water-confined nanosecond laser texturing (wNLT). The experimental setup for the wNLT uses a Q-Switched Nd:YAG nanosecond laser (Spectra-Physics Quanta-Ray Lab-150, wavelength 1064 nm) with a high energy per pulse on the order of several hundreds of mJ/pulse. During the wNLT process, the laser repetition rate is 10 pulses per second with a laser pulse duration of 6 to 8 ns. A galvanometer laser scanner (SCANLAB intelliSCAN® 20) furnished with an f-theta objective with a focal length of 255 mm directs the laser to texture the top surface of the specimen. A dynamic focusing unit (SCANLAB varioSCANde 40) is integrated with the scanner and provides a dynamic precise positioning of the laser focus along the optical z axis, thus enabling three-dimensional (3D) scanning along the contours of the workpiece being processed. See, e.g., FIG. 6. The specimen is submerged in deionized water during the wNLT step, which confines the laser pulse-induced plasma and enhances the texturing effect.

During the second, CIT step, the laser-textured work material is immersed in an ethanol solution with 1.5% volume percentage silane reagent (e.g., Trichloro (1H, 1H, 2H, 2H-perfluorooctyl) silane, 97%) at room temperature for about 3 hours. Specimens are then cleaned and dried at 80° C. in a vacuum oven for 1 hour.

Figure 7:
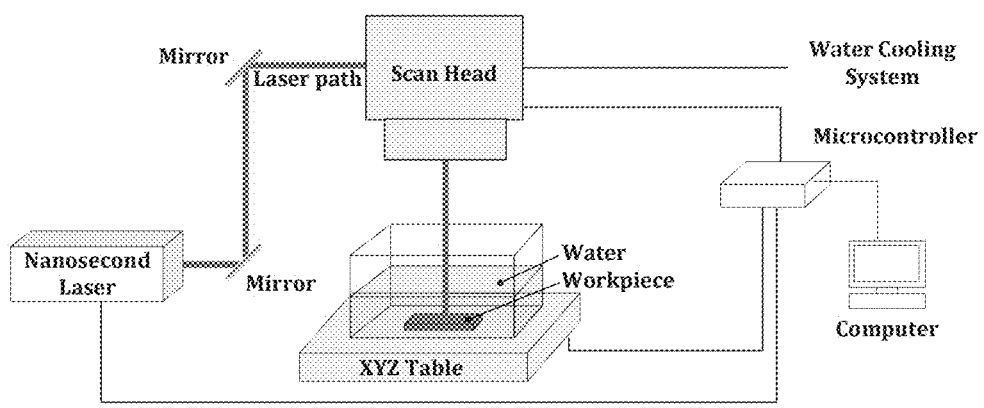
FIG. 7 is a schematic representation of the experimental setup for WNLT.

FIG. 7 is a schematic representation of a wNLT system and its optical path used for the current invention. The workpiece is kept under deionized water confinement (around 8 mm depth from the specimen surface) in a tank, which is positioned using computer-controlled stages. The combination of laser scan head and computer-controlled stages allows to have a wide range of laser scanning area during the process. Both laser and scan head are controlled by a microcontroller for scanning along a pre-designed path. The scan head is also connected to a water cooling system to avoid any undesirable heating during the process.

Figure 6:
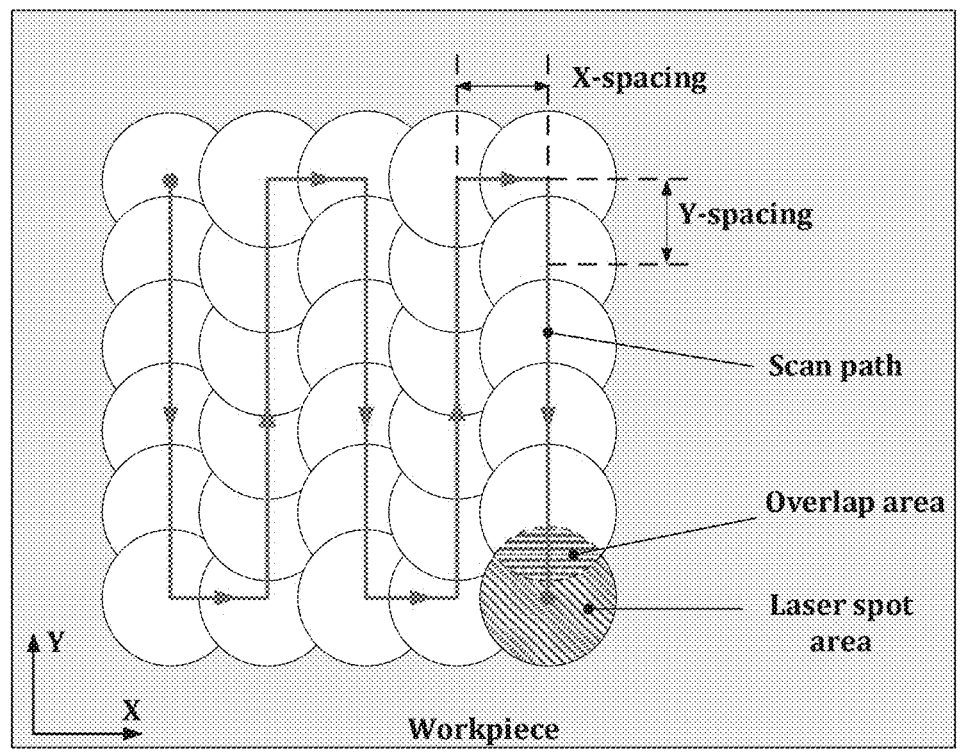
FIG. 6 is a schematic representation of laser scanning path during water-confined nanosecond laser texturing (wNLT).

FIG. 6 shows a laser scanning path that can be used for wNLT. The laser scan head scans the top surface of the work material in a "zig-zag" pattern. The X-spacing (or pitch) defines the distance between two sequential laser scan lines and is preset through computer control. The Laser Scan Line Density, as determined by Eq. 3, defines how many laser scan lines are required to scan a 1-inch width area. The Y-spacing between two sequential laser shots along the scanning direction is determined by the Laser Repetition Rate and preset Laser Scanning Speed as in Eq. 4. The Overlap Ratio is set by the ratio of Overlap Area to the Laser Spot Area as in Eq. 5. For all the experimental conditions in this study, a same value was applied for both X-spacing and Y-spacing, which guarantees the same Overlap Ratio of 50% in both directions. The Specific Laser Scanning Time (min/in$^2$) defines the time needed to scan a unit area of square inch as shown in Eq. 6. Laser Processing Rate defines the scanning area per unit time as shown in Eq. 7. The Laser Pulse Energy (mJ) of the Q-Switched Nd:YAG nanosecond laser (Spectra-Physics Quanta-Ray Lab-150, wavelength 1064 nm) can be adjustable from 0 to 710 mJ per pulse. The Laser Spot Area can be adjusted by moving the Z stage away from the focal plane. The Laser Power Intensity and Laser Fluence can be calculated using Eqs. 8-9, respectively.

For example, a specific laser scanning time of 15 s/in$^2$ (or 0.25 min/in$^2$) was achieved for wNLT of AISI 4130 Steel using the following process parameters: Laser Power Intensity of 0.20 GW/cm$^2$, Pulse Energy of 338 mJ, Laser Spot Diameter of 5.2 mm, Y-spacing of 2.1 mm, Laser Scan Line Density of 12 lines/in, Overlap Ratio of 50%, and Laser Scanning Speed of 21 mm/s.

$$\text{Laser Scan Line Density}(\text{lines/in}) = \frac{1 \text{ in}}{X - \text{spacing}} \quad (1)$$

$$Y - \text{spacing} = \frac{\text{Laser Scanning Speed}}{\text{Laser Repetition Rate}} \quad (2)$$

$$\text{Overlap Ratio} = \frac{\text{Overlap Area}}{\text{Laser Spot Area}} \times 100\% \quad (3)$$

$$\text{Specific Laser Scanning Time} = \quad (4)$$
$$\frac{1 \text{ in}}{\text{Laser Scanning Speed}} \times \text{Laser Scan Line Density}$$

$$\text{Laser Processing Rate}(\text{in}^2/\text{min}) = \frac{1}{\text{Specific Laser Scanning Time}} \quad (5)$$

$$\text{Laser Power Intensity}(\text{GW/cm}^2) = \frac{\text{Pulse Energy}}{\text{Pulse Duration} \times \text{Laser Spot Area}} \quad (6)$$

$$\text{Laser Fluence}(J/\text{cm}^2) = \frac{\text{Pulse Energy}}{\text{Laser Spot Area}} \quad (7)$$

Based on surface testing results, the methods/processes described herein produce superhydrophobic and anti-reflective surfaces for multiple important engineering metal alloys including AISI 4130 Steel, Titanium Ti-6Al-4V alloy (Ti-6Al-4V), and Aluminum Alloy 6061 alloy (AA-6061), magnesium AZ31B alloy (Mg AZ31B).

The surface structures produced by the methods/processes described herein are random nanostructures of various protrusions and cavities of size ranging from less than 100 nm to several hundreds of nm randomly distributed in the treated area. Viewed at a meso- or macro-scale, surfaces processed by the methods/processes described herein have an isotropic texture with numerous tiny pores homogenously distributed in the treated area. These random nanostructures are produced in a top-down approach during the methods/processes described herein.

The existing laser-based surface texturing technologies, in order to achieve superhydrophobic and anti-reflective metal surfaces, produce ordered microscale structures, either ordered microgrooves or microscale laser-induced periodic surface structure (LIPSS).

The relationship between the laser process parameters and the resultant surface wettability appears to be material-dependent and has been established as follows:

For AISI 4130 Steel, the methods/processes described herein produce consistent superhydrophobic surfaces, as long as the laser power intensity is equal or greater than 0.2 $GW/cm^2$. Using a laser power intensity less than 0.2 $GW/cm^2$, the treated surface does not achieve superhydrophobic with a contact angle less than 150°.

For AA 6061, the methods/processes described herein produce consistent superhydrophobic surfaces, as long as the laser power intensity is equal or greater than 0.4 $GW/cm^2$. Using a laser power intensity less than 0.4 $GW/cm^2$, the treated surface does not achieve superhydrophobic with a contact angle less than 150°.

For Mg AZ31B, the methods/processes described herein produce consistent superhydrophobic surfaces, as long as the laser power intensity is equal or greater than 0.6 $GW/cm^2$ For Ti-6Al-4V, the methods/processes described herein produce consistent hydrophobic surfaces with WCA ranging from 120° to 135° using a laser power intensity of 0.6-8.4 $GW/cm^2$.

The relationship between the laser process parameters and the resultant surface spectral reflectance within the visible and infrared spectrums appears to be material-dependent and has been established as follows.

For AISI 4130 Steel, using a laser power intensity from 0.6 to 1.3 $GW/cm^2$, the methods/processes described herein reduced the spectral reflectance to 20% within the visible spectrum, 20%-25% within the IR-A spectrum, 25%-35% within the IR-B spectrum. Using a laser power intensity from 2.4 to 8.4 $GW/cm^2$, the methods/processes described herein significantly reduced the spectral reflectance to 8.5%~9.3% within the visible spectrum, 9.3%-13.7% within the IR-A spectrum, 13.7%-17.7% within the IR-B spectrum. Using a laser power intensity of 18.2 $GW/cm^2$, the methods/processes described herein further reduced the spectral reflectance to 3%~5% within the visible spectrum, 5%-8% within the IR-A spectrum, 8%-11% within the IR-B spectrum.

For Ti-6Al-4V, using a laser power intensity from 0.6 to 0.9 $GW/cm^2$, the methods/processes described herein reduced the spectral reflectance to 6%~8% within the visible spectrum, 8%-17% within the IR-A spectrum, 17%-22% within the IR-B spectrum. Using a laser power intensity from 1.3 to 8.4 $GW/cm^2$, the methods/processes described herein significantly reduced the spectral reflectance to 6%~8% within the visible spectrum, 6%-10% within the IR-A spectrum, 10%-14% within the IR-B spectrum.

For AA 6061, using a laser power intensity from 0.6 to 8.4 $GW/cm^2$ the methods/processes described herein significantly reduced the spectral reflectance to 24%~31% within the visible spectrum, 24%-55% within the IR-A spectrum, 48%-55% within the IR-B spectrum.

Example 2

The wettability of the specimen surface produced by the methods/processes described herein was experimentally evaluated through water wetting tests. The definition of surface wettability can be described as follows: a surface is said to be wetted if one type of liquid spreads over the surface evenly without the formation of droplets. When the liquid is water, it spreads over the hydrophilic surface without the formation of droplets; while water droplets will form on hydrophobic surfaces. Hydrophobicity and hydrophilicity are relative terms. A simple quantitative method for defining the relative degree of interaction of water with a solid surface is the water contact angle (WCA) of a water droplet on a solid substrate. WCA is defined as the angle, conventionally measured through the water droplet, where a water-vapor interface meets a solid surface and can be used to quantify the wettability of a solid surface.

The surface wettability to water can be categorized into four kinds: hydrophobic, hydrophilic, superhydrophobic and superhydrophilic. If WCA is less than 30°, the surface is designated hydrophilic. If water spreads over a surface and the contact angle at the spreading front edge of the water is less than 10°, the surface is often designated as superhydrophilic (provided that the surface is not absorbing the water, dissolving in the water or reacting with the water). On a hydrophobic surface, water forms distinct droplets. As the hydrophobicity increases, the contact angle of the droplets with the surface increases. Surfaces with WCA greater than 90° are designated as hydrophobic. When WCA is greater than 150°, the surface is generally regarded as superhydrophobic.

Water Contact Angle for the treated specimen surface was measured during the wettability test using a contact angle goniometer (Rame-Hart model 100) coupled with a high-resolution CMOS camera (6~60× magnification, Thor Laboratories). For each WCA measurement, about 4 µL volume of water was dropped to form a still water droplet on the specimen surface, and its optical shadowgraph was obtained using the CMOS camera, as shown in FIG. 1. The optical shadowgraph was quantitatively analyzed using open source ImageJ software to determine the WCA for each measurement. Multiple WCA measurements were performed at various locations inside each specimen surface, and the average value of measurement results was obtained. Various materials produced by the methods/processes described herein were evaluated in these wetting tests including AISI 4130 Steel, Titanium Ti-6Al-4V alloy (Ti-6Al-4V), and Aluminum Alloy 6061 alloy (AA-6061), Magnesium AZ31B alloy (Mg AZ31B).

Figure 8:
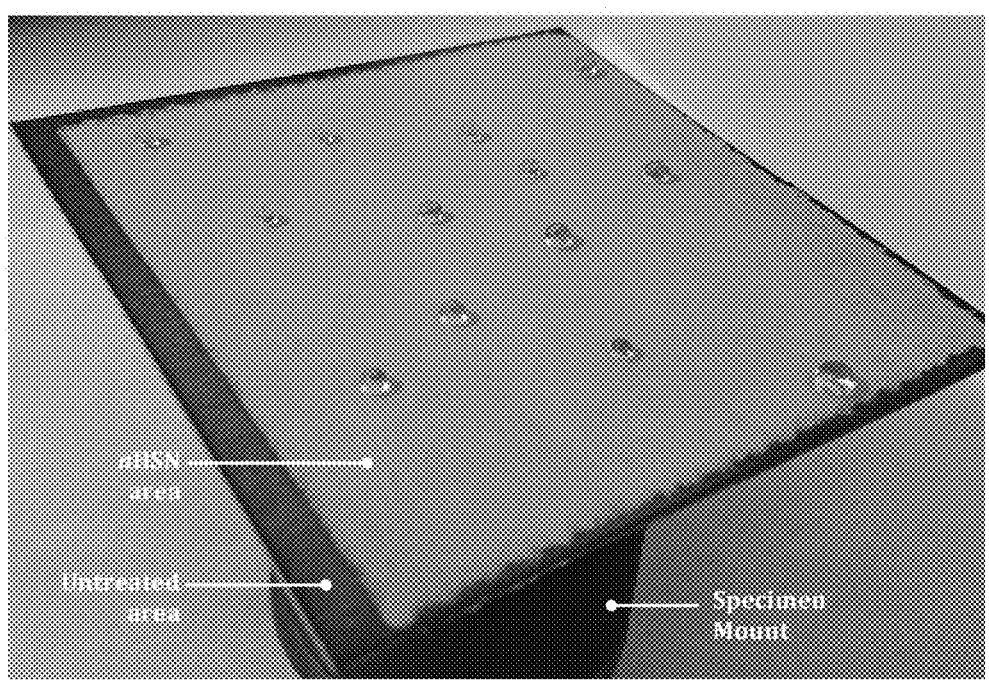
FIG. 8 is a photograph of still water droplets formed on superhydrophobic AA-6061 specimen surface produced by the nHSN process of the various embodiments described herein.

FIG. 8 shows the sprayed water droplets formed on the AA-6061 specimen surface treated by the methods/processes described herein. It is noted that completely spherical water droplets form on the nHSN surface, demonstrating the superhydrophobicity. The processed area has a dimension of 95 mm (length)×95 mm (width). For this specimen, a Specific Laser Scanning Time of 29 s/$in^2$ was achieved using the following laser process parameters: Laser Power Intensity of 0.40 $GW/cm^2$, Pulse Energy of 338 mJ, Laser Spot Diameter of 3.7 mm, Y-spacing of 1.5 mm, Laser Scan Line Density of 17 lines/in, Overlap Ratio of 50%, and Laser Scanning Speed of 15 mm/s. It took 6.7 minutes to scan this 95 mm×95 mm area. It should be noted the Laser Processing Rate is still limited in this case due to the laser equipment constraint of the current system using the Spectra-Physics Quanta-Ray Lab-15 nanosecond laser. An industry-level nanosecond laser will scale up the Laser Processing Rate and enable a larger area by using a higher Pulse Energy and a higher Laser Repetition Rate, while maintaining the same Laser Power Intensity.

The measurement results of water contact angle for AISI 4130 steel specimens treated from various process conditions including laser ablation in air, Nanosecond Laser Texturing (NLT) in air, water-confined Nanosecond Laser Texturing (wNLT), and their combinations with Chemical Immersion Treatment (CIT). The nHSN process consists of two steps of wNLT and CIT. The WCA was 85.8° for AISI 4130 steel specimen without any treatment, and became 96.9° after Chemical Immersion Treatment (CIT). This indicates CIT process alone does not significantly alter the surface wettability for specimens without laser surface treatment. Nanosecond laser ablation using the long-pulse mode (120 ns per pulse duration) produced a hydrophilic surface with a WCA less than 20° shortly after (within several hours) laser ablation. As the CIT, the WCA of the laser ablated specimen surface dramatically increased to 145°. Nanosecond Laser Texturing (NLT) in air using the Q-switch mode (6~8 ns per pulse duration) produced a hydrophilic surface with a WCA less than 20° shortly after (within several hours) laser texturing. With CIT, the WCA of the NLT specimen surface dramatically increased to 131°. Water-confined Nanosecond Laser Texturing (wNLT) using the Q-switch mode (6~8 ns per pulse duration) produced a hydrophilic surface with a WCA less than 20° shortly after (within several hours) laser texturing. However, by a following step of CIT after wNLT, the WCA of the nHSN specimen surface dramatically increased to 161°. Both NLT in air and nanosecond laser ablation processes require a fine spatial resolution, e.g., a fine laser line spacing of 60~100 μm, to scan the overall specimen surface, which leads to a low throughput for surface processing. In addition, these nanosecond laser processing conditions did not produce superhydrophobic surface with WCA greater than 150°. The methods/processes described herein produce superhydrophobic surface with WCA greater than 150°. The wNLT step significantly improves the processing efficiency by performing nanosecond laser texturing under water confinement. The wNLT step uses a large laser line spacing, e.g., 2.1 mm for a 5.2 mm laser spot, and a fast processing speed, e.g., 21 mm/s, and hence significantly increases the Specific Laser Scanning Time from hundreds of minutes per square inch to 15 s/in$^2$. In addition, the nHSN process enables large area processing for practical throughput.

Example 3

Water contact angle measurement results for AISI 4130 steel specimens produced by the methods/processes described herein using various laser power intensities ranging from 0.1 to 18.2 GW/cm$^2$. The uncertainty was typically around #2° for each test. The measurement for 0 GW/cm$^2$ was performed on the specimens produced by the CIT treatment alone, and their results show a WCA of 96.9°. The specimens treated by low laser power intensities from 0.1 to 0.15 GW/cm$^2$ during the wNLT step showed improved hydrophobicity with increased WCAs up to 139.4°. These tests also indicate that a higher laser power intensity during the wNLT step help increase the WCA by the nHSN process. The specimens treated by laser power intensities from 0.2 to 18.2 GW/cm$^2$ during the nHSN process all achieve superhydrophobicity with WCA greater than 150°. Varying laser power intensity does not significantly alter the WCA for these superhydrophobic AISI 4130 steel specimens. These results indicate a wide laser operation window exists for the nHSN process to produce consistent superhydrophobic AISI 4130 steel surfaces, as long as the laser power intensity is equal or greater than 0.2 GW/cm$^2$.

Example 4

Water contact angle measurement results for AA-6061 specimens produced by the methods/processes described herein using various laser power intensities ranging from 0.2 to 8.4 GW/cm$^2$. Similarly, the uncertainty was typically around #2° for each test. The specimens treated by low laser power intensities from 0.2 to 0.3 GW/cm$^2$ during the wNLT step showed improved hydrophobicity with increased WCAs up to 133.8°. These tests indicate that a higher laser power intensity during the wNLT step help increase the WCA of AA-6061 specimens processed by the nHSN process. The specimens treated by laser power intensities from 0.4 to 8.4 GW/cm$^2$ during the nHSN process all achieve superhydrophobicity with WCA greater than 150°. Varying laser power intensity does not significantly alter the WCA for these superhydrophobic AA-6061 specimens. These results indicate a wide laser operation window exists for the nHSN process to produce consistent superhydrophobic AA-6061 surfaces, as long as the laser power intensity is equal or greater than 0.4 GW/cm$^2$.

Example 5

Water contact angle measurement results for Mg AZ31B specimens produced by the methods/processes described herein using various laser power intensities ranging from 0.6 to 8.8 GW/cm$^2$. The uncertainty was typically around +2° for each test. The specimens all achieve superhydrophobicity with WCA greater than 150°. Varying laser power intensity does not significantly alter the WCA for these superhydrophobic Mg AZ31B specimens. These results indicate a wide laser operation window exists for the nHSN process to produce consistent superhydrophobic Mg AZ31B surfaces, as long as the laser power intensity is equal or greater than 0.6 GW/cm$^2$.

Water contact angle measurement results for TI-6Al-4V specimens produced by the nHSN process using various laser power intensities ranging from 0.6 to 8.4 GW/cm$^2$. The uncertainty was typically around $2° for each test. The specimens all achieve hydrophobicity with WCA ranging from 120° to 135°. Varying laser power intensity does not significantly alter the WCA for these hydrophobic Ti-6Al-4V specimens.

Example 6

Water sliding tests were performed on AISI 4130 steel, AA-6061, and Mg AZ31B specimens with WCA greater than 150° to further validate their superhydrophobicity. Generally, water sliding angle is defined as the critical angle where a water droplet begins to slide down an inclined plate, which does not exceed 10° for a superhydrophobic surface. During the water sliding tests, these specimens were tilted with a 6~8° angle from the horizontal plane. Sliding test results showed that water droplet rolled off the nHSN specimen surface smoothly for all the specimens, and thus validated their surface superhydrophobicity of these specimens with WCA greater than 150°. It should be noted that the critical water sliding angle of these specimens should be less than the tilt angle of 8°. For example, a very small water sliding angle of less than 2° was also used for the sliding tests for AA-6061 specimens, and the water droplet rolled off the specimen surface smoothly.

Example 7

Spectral reflectance measurement results for AISI 4130 steel specimens treated by the methods/processes described herein using various laser power intensities from 0.6 to 18.2 GW/cm$^2$. According to the classification by the International Commission on Illumination (CIE), the electromagnetic spectrum between 400~3,000 nm is subdivided into visible spectrum from 400 nm to 700 nm, IR-A spectrum from 700 nm to 1,400 nm, and IR-B spectrum from 1,400 nm to 3,000 nm. Following this classification, the spectrum of this reflectance measurement of 450~1670 nm is subdivided into visible spectrum from 450 nm to 700 nm, IR-A spectrum from 700 nm to 1,400 nm, and IR-B spectrum from 1,400 nm to 1,670 nm.

Spectral reflectance measurement results for untreated and mechanically ground AISI 4130 steel specimens are also shown for comparison. The spectral reflectance for the raw and untreated AISI 4130 steel specimens falls 24%~29% within the visible spectrum, 29%~48% within the IR-A spectrum, 48%~54% within the IR-B spectrum. The spectral reflectance for the mechanically ground AISI 4130 steel specimens falls 39%~41% within the visible spectrum, 41%-56% within the IR-A spectrum, 56%-68% within the IR-B spectrum. Using a laser power intensity from 0.6 to 1.3 GW/cm$^2$, the methods/processes described herein reduced the spectral reflectance to 20% within the visible spectrum, 20%-25% within the IR-A spectrum, 25%-35% within the IR-B spectrum. Using a laser power intensity from 2.4 to 8.4 GW/cm$^2$, the methods/processes described herein significantly reduced the spectral reflectance to 8.5%~9.3% within the visible spectrum, 9.3%-13.7% within the IR-A spectrum, 13.7%-17.7% within the IR-B spectrum. Using a laser power intensity of 18.2 GW/cm$^2$, the methods/processes described herein further reduced the spectral reflectance to 3%~5% within the visible spectrum, 5%-8% within the IR-A spectrum, 8%-11% within the IR-B spectrum. These results indicate that a highly anti-reflective AISI 4130 steel surface within the visible and IR spectrum can be realized by applying the methods/processes described herein. More importantly, the spectral reflectance of AISI 4130 steel can be adjusted and well controlled by carefully selecting the process parameters of methods/processes described herein. The higher the laser power intensity is applied, the lower the surface spectral reflectance will be achieved by methods/processes described herein.

Example 8

Spectral reflectance measurement results for TI-6Al-4V specimens treated by the methods/processes described herein were obtained using various laser power intensities from 0.6 to 8.4 GW/cm$^2$. Spectral reflectance measurement results for untreated and mechanically ground TI-6Al-4V specimens are also shown for comparison. The spectral reflectance for the untreated and mechanically ground Ti-6Al-4V specimens falls 28%~33% within the visible spectrum, 33%~42% within the IR-A spectrum, 42%~52% within the IR-B spectrum. The spectral reflectance for the mechanically ground Ti-6Al-4V specimens falls 35%~39% within the visible spectrum, 39%-45% within the IR-A spectrum, 45%-52% within the IR-B spectrum. Using a laser power intensity from 0.6 to 0.9 GW/cm$^2$, the nHSN process reduced the spectral reflectance to 6%~8% within the visible spectrum, 8%-17% within the IR-A spectrum, 17%-22% within the IR-B spectrum. Using a laser power intensity from 1.3 to 8.4 GW/cm$^2$, the nHSN process significantly reduced the spectral reflectance to 6%~8% within the visible spectrum, 6%-10% within the IR-A spectrum, 10%-14% within the IR-B spectrum. These results indicate that a highly anti-reflective Ti-6Al-4V surface within the visible and IR spectrum can be realized by applying the nHSN treatment. More importantly, the spectral reflectance of Ti-6Al-4V can be adjusted and well controlled by carefully selecting the process parameters of nHSN. The higher the laser power intensity is applied, the lower the surface spectral reflectance for Ti-6Al-4V will be achieved by nHSN.

Example 9

Spectral reflectance measurement results for AA-6061 specimens treated by the methods/processes described herein were obtained using various laser power intensities from 0.6 to 8.4 GW/cm$^2$. Spectral reflectance measurement results for untreated and mechanically ground AA-6061 specimens are also shown for comparison. The spectral reflectance for the untreated and mechanically ground AA-6061 specimens falls 55%~57% within the visible spectrum, 50%~75% within the IR-A spectrum, 75%~85% within the IR-B spectrum. The spectral reflectance for the mechanically ground AA-6061 specimens falls 65%~67% within the visible spectrum, 62%-80% within the IR-A spectrum, 80%-82% within the IR-B spectrum. Using a laser power intensity from 0.6 to 8.4 GW/cm$^2$, the nHSN process significantly reduced the spectral reflectance to 24%~31% within the visible spectrum, 24%-55% within the IR-A spectrum, 48%-55% within the IR-B spectrum. These results indicate that an anti-reflective AA-6061 surface within the visible and IR spectrum can be realized by applying the nHSN treatment. It is also found that the spectral reflectance for AA-6061 does not always decrease as the laser power intensity increasing from 0.6 to 8.4 GW/cm$^2$.

Based on the reflectance measurement for AISI 4130 steel, AA-6061 and Ti-6Al-4V specimens treated by the methods/processes described herein proved to be a highly efficient method in reducing the reflectance within the visible and infrared spectra.

Example 10

Vickers microhardness measurements were performed at multiple locations using a 50 gf to evaluate the change in surface strength. The AISI 4130 steel specimens used in these tests were by the methods/processes described herein using a laser power intensity of 2.4 GW/cm$^2$. The microhardness of untreated specimens were 159.1±7.7 HV. Through the methods/processes described herein, the surface microhardness was enhanced to 205.7±4.3 HV with a 29% increase. The microhardness measurement results indicate that the methods/processes described herein can enhance the surface mechanical strength and improve its resistance to wear.

Example 11

The surface microstructures were analyzed for various specimens for view areas ranging from 1 mm$^2$ to 4 µm$^2$ using a scanning electron microscope (SEM, model number Hitachi S-4800), as can be seen in FIG. 4. In this study, the specimens processed by nHSN and wNLT used the same laser power intensity of 7.3 GW/cm$^2$. Therefore, difference between the nHSN and wNLT surface micrographs shows any surface modification induced by the additional CIT step of the methods/processes described herein. Providing as a baseline, the micrographs of untreated raw specimen are shown on the left of FIG. 4, and exhibits a horizontal lay pattern for the micrographs taken at various magnifications from 100× to 20,000×. In comparison, at 100× magnification with a view area of about 1 mm$^2$, both nHSN and wNLT specimens show an isotropic texture without any obvious lay pattern. Apparently different from the wNLT specimen, numerous tiny pores can be seen homogenously distributed over the nHSN specimen. At 2,000× magnification with a view area of about 2,000 μm², the nHSN specimen shows numerous pores of various sizes, while microscale ripples can be seen all over the wNLT specimen surface. The microscale ripples on the wNLT specimen are induced from the nanosecond laser-steel interaction under water confinement, which are not observed in the nHSN specimen. This indicates the additional CIT step of the methods/processes described herein significantly modifies the surface morphology after the wNLT step. At 20,000× magnification with a view area of about 20 μm², structures of various shapes of protrusions and pores are revealed on the nHSN specimen, while the wNLT specimen is still characterized with microscale ripples decorated with some cracks and pores. At 50,000× magnification with a view area of about 4 μm², it is clearly discovered that the nHSN specimen is characterized of numerous random structures of rods, cones, platelets and pores. These features vary in size ranging from less than 100 nm to several hundreds of nm. In contrast, the wNLT specimen within such a small view area is characterized as a flat area dispersed with multiple nanoscale pores.

The present invention provides for the following embodiments, the numbering of which is not to be construed as designating levels of importance:

Embodiment 1 relates to a surface modified metal piece comprising: a first major surface, wherein at least one portion of the first major surface: comprises the reaction product of a surface modifier; has a random micro- and nanoscale structure; and has at least one of a water contact angle when exposed to water of at least about 120° and a spectral reflectance of less than about 25% within the visible spectrum.

Embodiment 2 relates to the surface modified metal piece of Embodiment 1, wherein the at least one portion of the first major surface comprising the surface modifier has a water contact angle when exposed to water of at least 150°.

Embodiment 3 relates to the surface modified metal piece of Embodiments 1-2, wherein the metal piece is made of steel, titanium, aluminum, magnesium, and alloys thereof.

Embodiment 4 relates to the surface modified metal piece of Embodiments 1-3, wherein the metal piece is AISI 4130 steel, titanium Ti-6Al-4V alloy (Ti-6Al-4V), aluminum alloy 6061 alloy (AA-6061) or magnesium AZ31B alloy (Mg AZ31B).

Embodiment 5 relates to the surface modified metal piece of Embodiments 1-4, wherein the surface modifier is the reaction product of a silane of the formula:

wherein each $X^1$ is halogen or a $C_1$-$C_6$-alkoxy group; and $R^1$ is a $C_8$-$C_{20}$-fluoro-substituted alkyl group; and reactive sites on a major surface of the metal piece.

Embodiment 6 relates to the surface modified metal piece of Embodiment 5, wherein $R^1$ is a group having the formula $C_n$—$F_{2n+1}$—$(CH_2)_2$— (organofunctional group), wherein the organofunctional group is 1H, 2H, 2H-perfluoralkyl; and n is an integer from 8 to 20.

Embodiment 7 relates to the surface modified metal piece of Embodiments 1-6, wherein the at least one portion of the first major surface has a spectral reflectance of less than 60% within the IR-A spectrum.

Embodiment 8 relates to the surface modified metal piece of Embodiments 1-7, wherein the at least one portion of the first major surface has a spectral reflectance of less than 30% within the IR-A spectrum.

Embodiment 9 relates to the surface modified metal piece of Embodiments 1-8, wherein the at least one portion of the first major surface has a spectral reflectance of less than 60% within the IR-B spectrum.

Embodiment 10 relates to the surface modified metal piece of embodiments 1-9, wherein the at least one portion of the first major surface has a spectral reflectance of less than 40% within the IR-B spectrum.

Embodiment 11 relates to a surface modified metal piece made by the process comprising: immersing a metal piece having a first major surface in an aqueous medium; texturing at least a portion of the first major surface along a nanosecond laser scan path at a laser scanning time of at least about 0.25 seconds/in² to obtain a textured metal piece having a textured surface along the scan path; removing the textured metal piece from the aqueous medium; and immersing the textured metal piece in a solution comprising a surface modifier, wherein the surface modifier reacts with the textured surface to obtain a modified metal surface; wherein: at least one of the textured surface along the scan path and the textured surface that reacts with the surface modifier has a random micro- and nanoscale structure; the nanosecond laser emits pulses of an appropriate energy onto the first major surface along the scan path; the nanosecond laser has a laser power intensity of greater than about 0.2 GW/cm²; the surface modifier reacts substantially only with the textured surface along the scan path; and the textured surface along the scan path that reacts with the surface modifier has at least one of a water contact angle when exposed to water of at least 120° and a spectral reflectance of less than 25% within the visible spectrum.

Embodiment 12 relates to the surface modified metal piece of Embodiment 11, wherein the laser power intensity is from 0.2 GW/cm² to about 20 GW/cm².

Embodiment 13 relates to the surface modified metal piece of Embodiments 11-12, wherein the textured surface along the scan path that reacts with the surface modifier has a water contact angle when exposed to water of at least 150°

Embodiment 14 relates to the surface modified metal piece of Embodiments 11-13, wherein the metal piece is made of steel, titanium, aluminum, magnesium, and alloys thereof.

Embodiment 15 relates to the surface modified metal piece of Embodiments 11-14, wherein the metal piece is AISI 4130 steel, titanium Ti-6Al-4V alloy (TI-6Al-4V), aluminum alloy 6061 alloy (AA-6061) or magnesium AZ31B alloy (Mg AZ31B).

Embodiment 16 relates to the surface modified metal piece of Embodiments 11-15, wherein the surface modifier is the reaction product of a silane of the formula:

wherein each $X^1$ is halogen or a $C_1$-$C_6$-alkoxy group; and $R^1$ is a $C_5$-$C_{20}$-fluoro-substituted alkyl group; and reactive sites on a major surface of the metal piece.

Embodiment 17 relates to the surface modified metal piece of Embodiment 16, wherein $R^1$ is a group having the formula $C_n$—$F_{2n+1}$—$(CH_2)_2$— (organofunctional group), wherein the "organofunctional group" is 1H, 2H, 2H-perfluoralkyl; and n is an integer from 8 to 20.

Embodiment 18 relates to the surface modified metal piece of Embodiments 11-17, wherein the at least one portion of the first major surface has a spectral reflectance of less than 60% within the IR-A spectrum.

Embodiment 19 relates to the surface modified metal piece of Embodiments 11-18, wherein the at least one portion of the first major surface has a spectral reflectance of less than 30% within the IR-A spectrum.

Embodiment 20 relates to the surface modified metal piece of Embodiments 11-19, wherein the at least one portion of the first major surface has a spectral reflectance of less than 60% within the IR-B spectrum.

Embodiment 21 relates to the surface modified metal piece of Embodiments 11-20, wherein the at least one portion of the first major surface has a spectral reflectance of less than 40% within the IR-B spectrum.

Embodiment 22 relates to a method of making a surface modified metal piece, the method comprising: immersing a metal piece having a first major surface in an aqueous medium; texturing at least a portion of the first major surface along a nanosecond laser scan path at a laser scanning time of at least about 0.25 seconds/in$^2$ to obtain a textured metal piece having a textured surface along the scan path; removing the textured metal piece from the aqueous medium; and immersing the textured metal piece in a solution comprising a surface modifier, wherein the surface modifier reacts with the textured surface to obtain a modified metal surface; wherein: at least one of the textured surface along the scan path and the textured surface that reacts with the surface modifier has a random micro- and nanoscale structure; the nanosecond laser emits pulses of an appropriate energy onto the first major surface along the scan path; the nanosecond laser has a laser power intensity of greater than about 0.2 GW/cm$^2$; the surface modifier reacts substantially only with the textured surface along the scan path; and the textured surface along the scan path that reacts with the surface modifier has at least one of a water contact angle when exposed to water of at least 120° and a spectral reflectance of less than 25% within the visible spectrum.

What is claimed is:

1. A method of making a nanostructured metal surface, the method comprising:
    treating at least a portion of a first major surface of a metal piece along a laser scan path of a laser at a laser scanning time of at least about 0.25 seconds/in$^2$, to obtain a treated metal surface along the laser scan path, the treated metal surface having random micro- and nanoscale structures along the laser scan path;
    wherein:
    the at least one portion of the first major surface of the metal piece is scanned in a zig-zag pattern;
    an X-spacing defines the distance between two sequential laser scan lines in the pattern, along the laser scan path;
    a Y-spacing defines the spacing between two sequential laser shots along a scanning direction along the laser scan path; and
    an overlap ratio of 50% exists in both the x-spacing and the Y-spacing;
    and wherein: the treated metal surface has a reflectance within a visible spectrum, within an IR-A spectrum, and within an IR-B spectrum; and
    wherein the treated metal surface has at least one of a water contact angle when exposed to water of at least 120° and a spectral reflectance of less than 25% within the visible spectrum.

2. The method of claim 1, wherein the laser has a power intensity of greater than about 0.2 GW/cm$^2$.

3. The method of claim 1, wherein the laser power intensity is from 0.2 GW/cm$^2$ to about 20 GW/cm$^2$.

4. The method of claim 1, the method further comprising:
    treating at least a portion of a first major surface of the metal piece in an aqueous medium.

5. The method of claim 4, the method further comprising:
    removing the treated metal surface from the aqueous medium and immersing the treated metal surface in a solution comprising a surface modifier, wherein the surface modifier reacts with the treated metal surface to obtain a modified metal surface.

6. The method of claim 5, wherein the modified metal surface comprises the reaction product of a silane of the formula:

$$X^1{}_3SiR^1$$

wherein each $X^1$ is halogen or a $C_1$-$C_6$-alkoxy group; and $R^1$ is a $C_8$-$C_{20}$-fluoro-substituted alkyl group; and reactive sites on a major surface of the textured metal piece modified meal surface.

7. The method of claim 6, wherein $R^1$ is a group having the formula $C_n$—$F_{2n+1}$—$(CH_2)_2$— (organofunctional group), wherein the organofunctional group is 1H, 2H, 2H-perfluoralkyl; and n is an integer from 8 to 20.

8. The method of claim 1, wherein the modified treated metal surface has a water contact angle when exposed to water of at least 150°.

9. The method of claim 1, wherein the at least one portion of a first major surface of the treated metal surface has a spectral reflectance of less than 60% within the IR-A spectrum.

10. The method of claim 1, wherein at least one portion of a first major surface of the treated metal surface has a spectral reflectance of less than 30% within the IR-A spectrum.

11. The method of claim 1, wherein the at least one portion of a first major surface of the treated metal surface has a spectral reflectance of less than 40% within the IR-B spectrum.

12. The method of claim 1, wherein the metal piece is made of steel, titanium, aluminum, magnesium, and alloys thereof.

13. The method of claim 1, wherein the metal piece is AISI 4130 steel, titanium Ti-6A1-4V alloy (Ti-6A1-4V), aluminum alloy 6061 alloy (AA-6061) or magnesium AZ31B alloy (Mg AZ31B).

* * * * *